United States Patent [19]
Fujiki et al.

[11] Patent Number: 5,438,094
[45] Date of Patent: Aug. 1, 1995

[54] ADHESIVE SILICONE COMPOSITIONS

[75] Inventors: Hironao Fujiki, Takasaki; Hiroyasu Hara; Mikio Shiono, both of Annaka; Masayuki Ikeno, Maebashi, all of Japan

[73] Assignee: Shin-Etsu Chemical Co., Ltd., Tokyo, Japan

[21] Appl. No.: 266,336

[22] Filed: Jul. 1, 1994

[30] Foreign Application Priority Data

Jul. 6, 1993 [JP] Japan .................. 5-191957

[51] Int. Cl.$^6$ ................................ C08K 5/54
[52] U.S. Cl. .................... 524/730; 524/742; 524/743; 524/744; 524/773; 524/774; 524/856; 524/862; 528/15
[58] Field of Search .............. 528/15; 524/773, 774, 524/730, 742, 743, 744, 856, 862

[56] References Cited

U.S. PATENT DOCUMENTS

| | | |
|---|---|---|
| 3,517,001 | 6/1970 | Berger . |
| 3,699,072 | 10/1972 | Clark et al. . |
| 4,011,247 | 3/1977 | Sato et al. . |
| 4,257,936 | 3/1981 | Matsumoto et al. . |
| 4,465,818 | 8/1984 | Shirihata et al. ............ 528/15 |
| 5,328,974 | 7/1994 | McAee ..................... 528/15 |

*Primary Examiner*—Melvyn I. Marquis
*Attorney, Agent, or Firm*—Birch, Stewart, Kolasch & Birch

[57] ABSTRACT

An adhesive silicone composition comprising (A) an alkenyl group-containing organopolysiloxane, (B) an organohydrogen-polysiloxane having at least three hydrogen atoms each directly bonded to a silicon atom in a molecule, (C) a compound having at least one aliphatic unsaturated group and at least two phenyl skeletons in a molecule, and (D) a platinum catalyst is well adhesive to both metals and reins, and even to difficult-to-adhere resins such as nylon, polycarbonate and acryl resins.

20 Claims, No Drawings

ADHESIVE SILICONE COMPOSITIONS

BACKGROUND OF THE INVENTION

1. Field of the Invention

This invention relates to adhesive silicone compositions having improved adhesion to various organic resins and metals.

2. Prior Art

In the prior art, several methods are known for bonding addition curing type silicone rubber and organic resins together. One exemplary method is by applying a primer to molded resin, applying uncured silicone rubber thereover, and then curing the rubber to the resin. In another known method, self-adhesive silicone rubber material is cured to molded resin. As to the self-adhesive silicone rubber, there were proposed a number of compositions, most of which are characterized by specific adhesive components. For example, Japanese Patent Application Kokai (JP-A) No. 54-80358 discloses addition reaction products of aminoalkoxysilanes and epoxyalkoxysilanes; U.S. Pat. No. 3,699,072 corresponding to Japanese Patent Publication (JP-B) No. 53-21026 discloses partial addition products of hydrogenated polysiloxane having an alkoxysilyl group partially added thereto; U.S. Pat. No. 4,257,936 corresponding to JP-A 54-48853 discloses addition products of hydrogenated siloxane cyclics having acryltrialkoxysilanes added thereto; U.S. Pat. No. 4,011,247 corresponding to JP-B 51-33540 discloses epoxy addition products of hydrogenated siloxanes; U.S. Pat. No. 3,517,001 corresponding to JP-B 45-23354 discloses alkoxysilane addition products of triallyl isocyanurate; and JP-A 54-37157 discloses the use of glycidyl-containing compounds and acid anhydrides.

Although self-adhesive silicone rubber compositions using these adhesive components have improved in adhesion to metals and some are fully acceptable for practical use, they are not fully adhesive to advanced engineering plastics, especially nylon, polycarbonate and acryl resins.

SUMMARY OF THE INVENTION

An object of the present invention is to provide an adhesive silicone composition having improved adhesion to not only various metals, but also various plastics including nylon, polycarbonate and acryl resins.

The inventors have found that by blending (A) an alkenyl group-containing organopolysiloxane, (B) an organohydrogenpolysiloxane of formula (1), (2) or (3) shown below having at least three hydrogen atoms each directly bonded to a silicon atom in a molecule, (C) a compound having at least one aliphatic unsaturated group and at least two phenylene skeletons in a molecule, and (D) a platinum catalyst, there is obtained an adhesive silicone composition which adheres well not only to various metals, but also to various organic resin, especially those plastics which are regarded as difficult-to-adhere resins in the prior art, for example, nylon, polycarbonate and acryl resins.

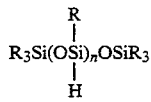 (1)

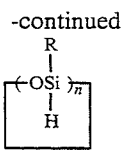 (2)

 (3)

In the formulae, R is a substituted or unsubstituted monovalent hydrocarbon group and letter l is an integer of 3 or 4 and letter n is an integer of at least 3.

More particularly, a compound having at least one aliphatic unsaturated group and at least two phenylene skeletons in a molecule, when singly blended in silicone compositions, exhibits a very interesting behavior that the compositions adhere to only organic resins, but not to metals. If this compound is used along with a SiH group-containing organohydrogen-polysiloxane of formula (1), (2) or (3), quite unexpectedly the resulting compositions can effectively adhere not only to various organic resins, especially those organic resins which are hitherto difficult to adhere with conventional addition curing type silicone rubber adhesives, for example, nylon, polycarbonate and acryl resins, but also to various metals. Adhesion is further improved when the above-mentioned compound is used in combination with a compound having a SiH group and an alkoxysilyl and-/or glycidyl group in a molecule which is believed to contribute to adhesion in conventional addition curing type silicone rubber adhesives.

Accordingly, the present invention provides an adhesive silicone composition comprising (A) an alkenyl group-containing organopolysiloxane, (B) an organohydrogenpolysiloxane having at least three hydrogen atoms each directly bonded to a silicon atom in a molecule, selected from those represented by the general formulae (1), (2), and (3) defined above, (C) a compound having at least one aliphatic unsaturated group and at least two phenylene skeletons in a molecule, and (D) a platinum catalyst.

DETAILED DESCRIPTION OF THE INVENTION

A first component (A) of the adhesive silicone composition according to the present invention is an alkenyl group-containing organopolysiloxane. It preferably has a viscosity of about 100 to 500,000 centipoise at 25° C. It is a well-known organopolysiloxane commonly used as a main ingredient of conventional addition curing type silicone rubber. Preferred are organopolysiloxanes of the following general formula (4):

wherein $R^1$ is a substituted or unsubstituted monovalent hydrocarbon group and letter a is a number of 1.9 to 2.4.

In formula (4), $R^1$ is preferably selected from hydrocarbon groups having 1 to 10 carbon atoms, more preferably having 1 to 6 carbon atoms, for example, alkyl groups such as methyl, ethyl, propyl, isopropyl, butyl, tert-butyl, hexyl, cyclohexyl and octyl; alkenyl groups such as vinyl, allyl, propenyl, isopropenyl, butenyl, hexenyl and cyclohexenyl; aryl groups such as phenyl, tolyl and xylyl; aralkyl groups such as benzyl and phenylethyl and; halo-or cyano-substituted hydrocarbon groups in which some or all of the hydrogen atoms of the foregoing groups are substituted with halogen atoms or cyano groups, such as chloromethyl, cyanoethyl and 3,3,3 -trifluoropropyl. The substituents represented by $R^1$ may be identical or different insofar as at least one alkenyl group, preferably 2 to 10 alkenyl groups are contained in the molecule. Basically the substituent $R^1$ bonded to the silicon atom may be any of the foregoing groups, although it is preferred to introduce vinyl or allyl groups as the alkenyl group and methyl, phenyl and trifluoropropyl groups as the other substituents. The organopolysiloxane may be of a straight chain or a branched one containing $R^1SiO_{3/2}$ or $SiO_{4/2}$ units.

Examples of the organopolysiloxane represented by formula (4) are given below.

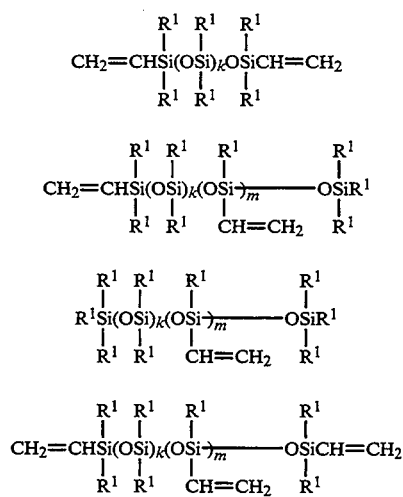

In the formulae, $R^1$ is as defined above except that aliphatic unsaturated hydrocarbon groups are excluded, letter k is 60 to 1500, and m is 1 to 300.

The organopolysiloxanes of formula (4) can be readily prepared by well-known methods, for example, by effecting equilibration reaction among organocyclopolysiloxanes and hexaorganodisiloxanes in the presence of alkali or acid catalysts.

A second component (B) of the composition is an organohydrogenpolysiloxane having at least three hydrogen atoms each directly bonded to a silicon atom in a molecule. It acts as a crosslinking agent which reacts with the first component and is effective for improving the adhesion of the composition when used along with a third component to be described later. It is selected from those represented by the following general formulae (1), (2), and (3):

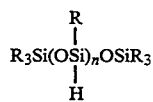
(1)

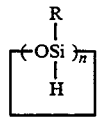
(2)

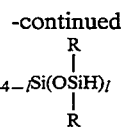
(3)

wherein R is a substituted or unsubstituted monovalent hydrocarbon group and letter l is an integer of 3 or 4, and n is an integer of at least 3.

In formulae (1) to (3), R is preferably selected from hydrocarbon groups having 1 to 10 carbon atoms, more preferably having 1 to 6 carbon atoms, for example, alkyl groups such as methyl, ethyl, propyl, isopropyl, butyl, tert-butyl, hexyl, cyclohexyl and octyl; aliphatic unsaturated hydrocarbon groups exemplified by alkenyl groups such as vinyl, allyl, propenyl, isopropenyl, butenyl, hexenyl and cyclohexenyl; aryl groups such as phenyl, tolyl, and xylyl; aralkyl groups such as benzyl and phenylethyl and halo-or cyano-substituted hydrocarbon groups such as chloromethyl, cyanoethyl and 3,3,3 -trifluoropropyl. The substituents represented by R may be identical or different. Letter l is an integer of 3 or 4 and letter n is an integer of 3 or more, preferably 3 to 50.

Among the organohydrogenpolysiloxanes of formulae (1) to (3), those of formulae (1) and (2) are preferred when a substantial pot life is required.

The organohydrogenpolysiloxane (B) is preferably added in amounts of about 1 to about 20 parts, more preferably about 1 to about 5 parts by weight per 100 parts by weight of the organopolysiloxane (A). On this basis, less than 1 part of component (B) would be too small to develop full adhesion whereas with more than 20 parts of component (B), hydrogen gas would be given off during storage of the composition and there be a risk of expansion upon curing.

Also preferably, the organohydrogenpolysiloxane is added such that the hydrogen atom bonded to a silicon atom in the second component (B) may be present in an amount of 0.4 to 10 equivalents, especially 0.8 to 5 equivalents per aliphatic unsaturated group contained in the first and third components (A) and (C). With less than 0.4 equivalents of hydrogen atom on this basis, curing would be insufficient to provide mechanical strength. More than 10 equivalents of hydrogen atom would cause the composition to experience a change with time and expand upon curing.

In the practice of the invention, it is acceptable that an additional hydrogenpolysiloxane which is conventionally blended in addition curing type silicone compositions be added to the composition along with the above-mentioned organohydrogenpolysiloxane (B) for the purpose of accelerating the curing rate and enhancing the cured hardness. The additional hydrogenpolysiloxane is represented by the following formula (5):

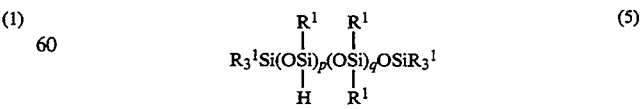
(5)

wherein $R^1$ is as defined above, letter p is an integer of at least 3, preferably 3 to 50, and q is an integer of at least 1, preferably 1 to 150, and p+q is an integer of 4 to 300, preferably 4 to 200. Preferably the addition hydrogenpolysiloxane is added in an amount of 0.5 to 10 parts per 100 parts by weight of the organopolysiloxane (A).

A third component (C) of the adhesive silicone composition is a compound having at least one aliphatic unsaturated group and at least two phenylene skeletons in a molecule. This compound is an essential tackifier component which cooperates with component (B) or organohydrogenpolysiloxane such that the composition may be adhesive. The preferred compounds have an aliphatic unsaturated group such as alkenyl group and p-phenylene skeletons and are those of the following general formula (6), more preferably those of the following general formula (7).

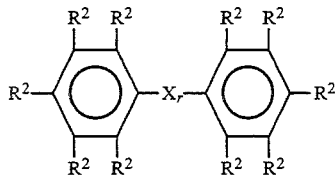
(6)

In formula (6), $R^2$ is a hydrogen atom, a hydroxyl group, a halogen atom, an alkyl group, an alkenyl group, an alkoxy group, an alkenyloxy group, an aryl group, or a monovalent organic group containing an alkenyl group, an alkoxy group, a glycidyl group, a carbonyl group, a carbonyloxy group, a silyloxy group or alkoxysilyl group. At least one, preferably 1 to 4, more preferably one or two of $R^2$s are an alkenyl group or a monovalent organic group containing an alkenyl group.

X is selected from the following groups:

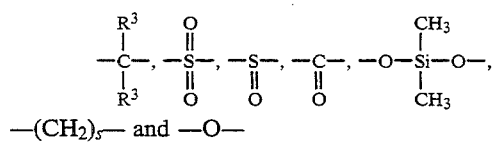

$-(CH_2)_s-$ and $-O-$ wherein $R^1$ is a hydrogen atom, a halogen atom, or a substituted or unsubstituted alkyl, aryl, alkenyl or alkynyl group, and s is a positive number of at least 2, preferably 2 to 4. Letter r is equal to 0 or 1.

In $R^2$ and $R^3$ the alkyl and alkoxy groups should preferably have 1 to 10 carbon atoms, more preferably 1 to 8 carbon atoms, most preferably 1 to 6 carbon atoms. The aryl group should preferably have 6 to 10 carbon atoms, more preferably 6 to 8 carbon atoms. The alkenyl, alkynyl and alkenyloxy groups should preferably have 2 to 10 carbon atoms, more preferably 2 to 8 carbon atoms, most preferably 2 to 6 carbon atoms. The monovalent organic group should preferably have 1 to 12 carbon atoms, more preferably 2 to 10 carbon atoms, most preferably 2 to 8 carbon atoms.

Examples of alkyl, alkenyl and aryl groups are the same as exemplified in R in the second component (B). Examples of alkynyl group include an acetylene group. Examples of alkoxy and alkenyloxy groups include methoxy, ethoxy, propoxy, isopropoxy, butoxy, tert-butoxy, methoxyethoxy, ethoxyethoxy, vinyloxy, allyloxy, propenoxy, isopropenoxy, butenyloxy and so forth.

Examples of the monovalent organic group containing an alkenyl, alkoxy, glycidyl, carbonyl, carbonyloxy, silyloxy or alkoxysilyl group include the following groups:

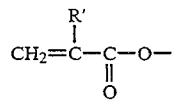

wherein R' represents a hydrogen atom or a methyl group,

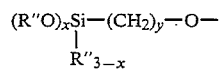

wherein R" represents a monovalent hydrocarbon group having 1 to 6 carbon atoms such as an alkyl group, an alkenyl group and an aryl group, x is 1, 2 or 3, and y is an integer of 0 to 6,

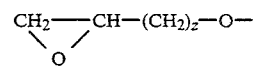

wherein z is an integer of 1 to 6, and

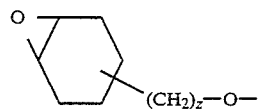

wherein z is an integer of 1 to 6.

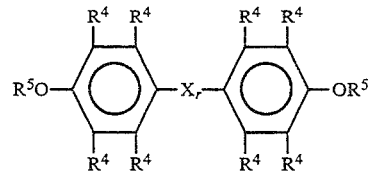
(7)

In formula (7), $R^4$ is a hydrogen atom, a hydroxyl group, a halogen atom, an alkyl group having 1 to 10 carbon atoms, preferably 1 to 8 carbon atoms, more preferably 1 to 6 carbon atoms, or an alkenyl group having 2 to 10 carbon atoms, preferably 2 to 8 carbon atoms, more preferably 2 to 6 carbon atoms. $R^5$ is an alkenyl group having 2 to 12, preferably 2 to 10 carbon atoms, a monovalent organic group containing an alkenyl group having 2 to 12, preferably 2 to 10 carbon atoms, $-R_t^6-SiR_3^7$ or $-CO-R^7$. $R^6$ is an alkylene group having 1 to 6 carbon atoms, preferably 1 to 4 carbon atoms. Letter t is 0 or 1. $R^7$ is an alkyl group having 1 to 6 carbon atoms, an alkenyl group having 2 to 6 carbon atoms or an alkoxy group having 1 to 6 carbon atoms.

One or two of $R^5$s should be an alkenyl group or a monovalent organic group containing an alkenyl group.

X and r have the same meanings as described above.

Examples of the alkyl, alkenyl and the monovalent organic group containing an alkenyl group are the same as exemplified in $R^2$. Examples of the alkylene group include methylene group, ethylene group, trimethylene group, tetramethylene group, hexamethylene group, methylethylene group and so forth.

Examples of the compound are given below.

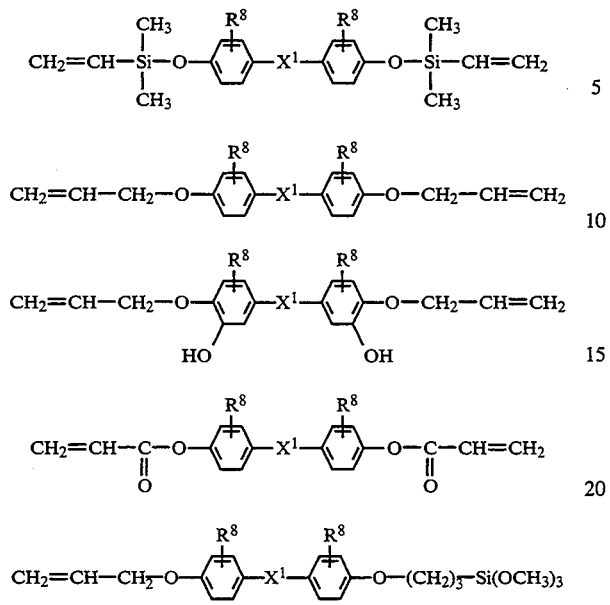

In the above formulae, $X^1$ is —O—, —CH$_2$—,

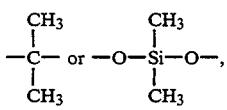

and $R^8$ is a hydrogen atom, vinyl group or allyl group.

Component (C) is not limited to the foregoing exemplary compounds. Such compounds having three or more phenylene groups are also acceptable.

Component (C) is preferably added in amounts of about 0.1 to about 20 parts by weight per 100 parts by weight of the organopolysiloxane (A). On this basis, less than 0.1 part of component (C) would be too small to develop full adhesion whereas with more than 20 parts of component (C), cured products would be hard and brittle.

In the practice of the invention, in addition to components (B) and (C), there may be added a compound, preferably an organopolysiloxane compound, more preferably a cyclic or linear organopolysiloxane compound having a SiH group and an alkoxysilyl and/or glycidyl group in a molecule which is used in conventional curing type silicone rubber adhesives. Addition of this compound is effective for further improving adhesion to various metals and organic resins and expanding the range of materials to which the inventive composition can be adhered. Examples of the alkoxysilyl and/or glycidyl-containing organopolysiloxane compound as well as having Si—H groups in a molecule are given below.

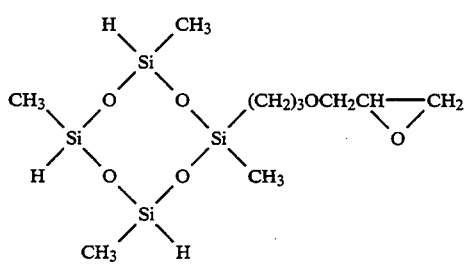

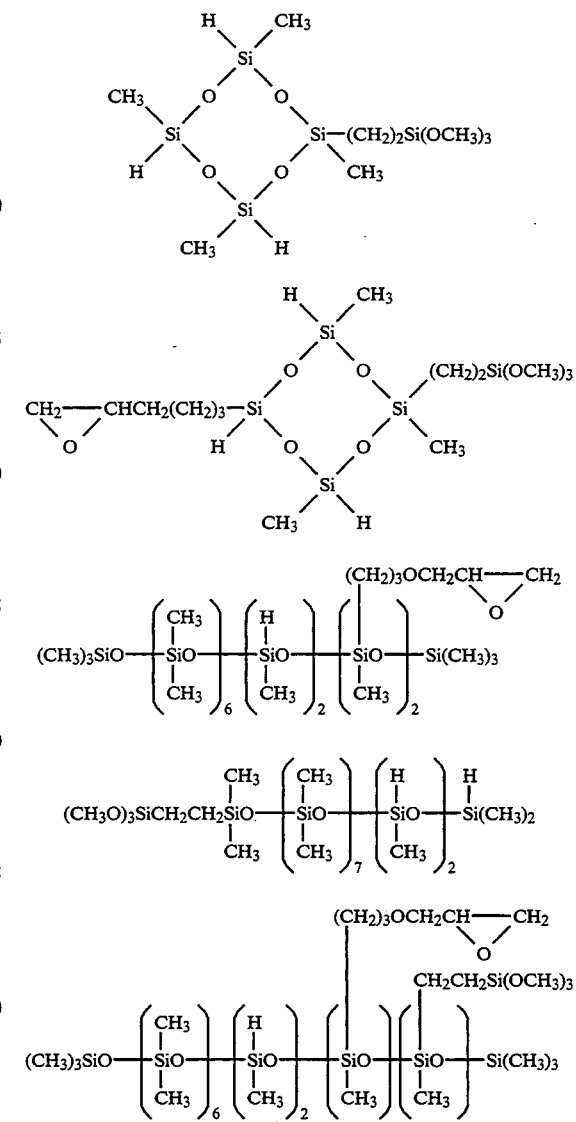

Preferably, the alkoxysilyl and/or glycidyl-containing compound is added in an amount of about 0.1 to 20 parts by weight per 100 parts by weight of the organopolysiloxane (A).

A fourth component (D) of the adhesive silicone composition is a platinum catalyst which is selected from platinum and platinum compounds. The platinum catalyst is effective for promoting curing addition reaction or hydrosilylation between components (A) and (B). Exemplary catalysts are platinum black, chloroplatinic acid, alcohol-modified chloroplatinic acid, and complexes of chloroplatinic acid with various olefins, aldehydes, vinylsiloxanes and acetylene alcohol.

The platinum catalyst is used in a catalytic amount which may be determined in accordance with the desired curing rate. Preferably the catalyst is added such that about 0.1 to 1000 parts, especially about 1 to 200 parts by weight of elemental platinum is available per million parts by weight of the composition.

In addition to the foregoing essential and optional components, the adhesive silicone composition of the invention may further contain other optional components. Where it is desired to impart strength to the composition, for example, semi-reinforcing fillers such as ground quartz, diatomaceous earth, calcium carbonate, alumina, and carbon black and reinforcing fillers such as finely divided silica are useful. Examples of the reinforcing filler include Aerosil 130, 200 and 300 (commercially available from Nipon Aerosil K.K. and Degussa), Cabosil MS-5 and MS-7 (commercially available from Cabot Corp.), Rheorosil QS-102 and 103 (commercially available from Tokuyama Soda K.K.), and Nipsil LP (commercially available from Nippon Silica K.K.) as hydrophilic silica and Aerosil R-812, R-812S, R-972, and R-974 (commercially available from Degussa), Rheorosil MT-10 (commercially available from Tokuyama Soda K.K.), and Nipsil SS series (commercially available from Nippon Silica K.K.) as hydrophobic silica. Preferably the filler is added in amounts of about 10 to 150 parts by weight per 100 parts by weight of component (A).

If it is desired to adjust the curing time in order that the composition be practical, there may be blended curing control agents, for example, vinyl group-containing organopolysiloxanes (e.g., vinylcyclotetrasiloxane), triallyl isocyanurate, alkyl maleates, acetylene alcohols and silanes thereof, modified siloxanes, hydroperoxides, tetramethylethylene-diamine, benzotriazole, and mixtures thereof.

It is also acceptable to add coloring agents such as inorganic pigments (e.g., cobalt blue) and organic dyes and agents for enhancing heat resistance and flame retardancy such as cerium oxide, zinc carbonate, manganese carbonate, iron oxide, titanium oxide, and carbon black.

In curing the composition of the invention, it may be heated at a temperature of about 60° to 200° C. for about 5 minutes to about 5 hours.

There has been described an adhesive silicone composition which is well adhesive not only to various metals, but also to various organic resins, especially those plastics which are regarded as difficult-to-adhere resins in the prior art, for example, nylon, polycarbonate and acryl resins. Thus the composition finds wide use as adhesive.

EXAMPLE

Examples of the invention are given below by way of illustration and not by way of limitation. All parts are by weight.

Examples

A kneader was charged with 100 parts of a polydimethylsiloxane blocked with a dimethylvinylsilyl group at each molecular end and having a viscosity of 10,000 centipoise at 25° C., 40 parts of fumed silica having a specific surface area of 300 cm²/g, 8 parts of hexamethyldisilazane, and 1 part of water. The ingredients were agitated and mixed for one hour at room temperature and then heated to 150° C. and mixed for a further 2 hours at the temperature. Thereafter, the mixture was cooled down to room temperature. To the mixture were added 20 parts of the polydimethylsiloxane blocked with a dimethylvinylsilyl group at each molecular end and having a viscosity of 10,000 centipoise at 25° C., 0.1 part of acetylene alcohol for extending the time to curing at room temperature, and 50 ppm calculated as elemental platinum of a platinum vinylsiloxane complex. The mixture was thoroughly mixed until uniform.

To 100 parts of the base compound, a methylhydrogenpolysiloxane and a tackifier component (compound having an aliphatic unsaturated group and phenylene skeletons) both shown below were added in the amounts shown in Table 1. In this way, six silicone rubber compositions were obtained as shown in Table 1.

The silicone rubber compositions were applied to plates of various materials and cured at 120° C. for one hour before they were examined for adhesion. Adhesion was examined by inserting a knife between the cured product and the plate to a depth of 15 mm and peeling the cut silicone section over an angle of 180° to visually observe the adhesion interface.

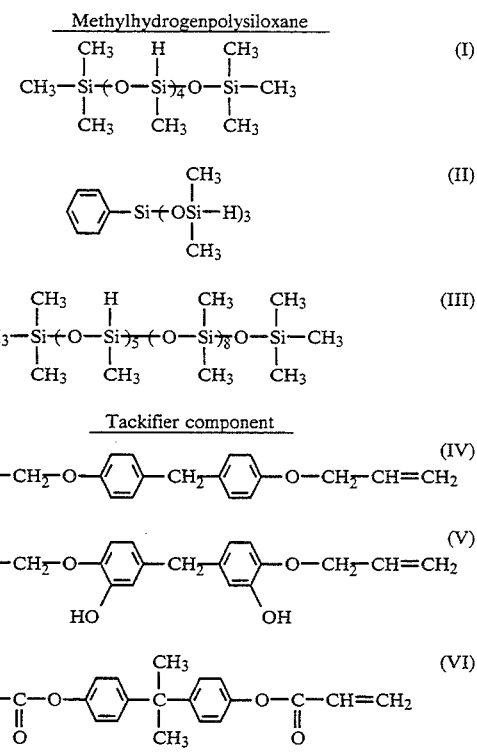

TABLE 1

| | Ingredients added to the base compound (parts by weight) | | | | | |
|---|---|---|---|---|---|---|
| | Example 1 | Example 2 | Example 3 | Example 4 | Comparative Example 1 | Comparative Example 2 |
| I | 3 | 3 | 3 | — | — | — |
| II | — | — | — | 3 | — | — |
| III | — | — | — | — | 3 | 3 |
| IV | 1 | — | — | 1 | 1 | — |
| V | — | 1 | — | — | — | 1 |
| VI | — | — | 1 | — | — | — |

Example 1

The composition of Example 1 was examined for adhesion using polycarbonate resin, PBT, aluminum, and chromium as the object material to which the composition was to be bonded. The composition provided good adhesion to all the object materials.

Example 2

The composition of Example 2 was examined for adhesion to nylon resin to find good adhesion. It also firmly adhered to aluminum and chromium.

Example 3

The composition of Example 3 was examined for adhesion to acryl resin to find good adhesion. Adhesive tests to polycarbonate resin and PBT were also done to find good adhesion. It also firmly adhered to aluminum and chrominum.

Example 4

The composition of Example 4 was examined for adhesion using polycarbonate resin, PBT, aluminum, and chromium as the object material. The composition provided good adhesion to all the object materials.

Comparative Example 1

The composition of Comparative Example 1 was examined for adhesion using polycarbonate resin, PBT, aluminum, and chromium as the object material. The composition provided good adhesion to aluminum, but yielded interfacial separation with respect to the remaining object materials. Adhesion tests to acryl resin and nylon resin were also done to find interfacial peeling or poor bond.

Comparative Example 2

The composition of Comparative Example 2 was examined for adhesion using polycarbonate resin, PBT, aluminum, and chromium as the object material. The composition yielded interfacial separation from all the object materials. Adhesion tests to acryl resin and nylon resin were also done to find interfacial peeling or poor bond.

Japanese Patent Application No. 5-191957 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:
1. Adhesive silicone composition comprising
   (A) an alkenyl group-containing organopolysiloxane,
   (B) an organohydrogenpolysiloxane having at least three hydrogen atoms each directly bonded to a silicon atom in a molecule, selected from those represented by the following general formulae (1), (2), or (3):

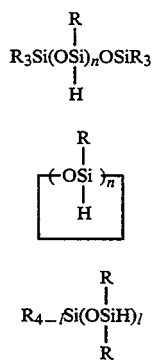

wherein R is a substituted or unsubstituted monovalent hydrocarbon group, letter l is an integer of 3 or 4 and letter n is an integer of at least 3, (C) a compound having at least one aliphatic unsaturated group and at least two phenylene skeletons in a molecule, and
   (D) a platinum catalyst.

2. The adhesive silicone composition of claim 1, wherein organopolysiloxane (A) is of the formula:

wherein $R^1$ is a substituted or unsubstituted monovalent hydrocarbon group, at least one $R^1$ is an alkenyl group, and letter a is a number of 1.9 to 2.4.

3. The adhesive silicone composition of claim 1, wherein said compound having at least one aliphatic unsaturated group and at least two phenylene skeletons in a molecule is of the formula:

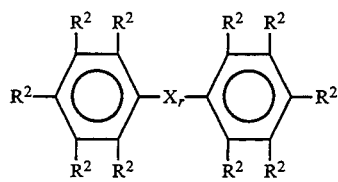

wherein $R^2$ is a hydrogen atom, a hydroxyl group, a halogen atom, an alkyl, alkenyl, alkoxy, alkenyloxy or aryl group, or a monovalent organic group containing an alkenyl, alkoxy, glycidyl, carbonyl, carbonyloxy, silyloxy or alkoxysilyl group, and at least one $R^2$ group is an alkenyl group or an organic group containing an alkenyl group, and X is selected from the following groups:

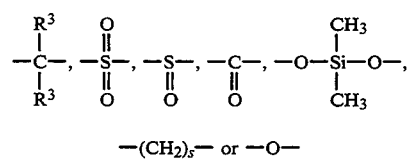

wherein $R^3$ is a hydrogen atom, a halogen atom, or a substituted or unsubstituted alkyl, aryl, alkenyl or alkynyl group, and s is a positive number of at least 2, and letter r is equal to 0 or 1.

4. The adhesive silicone composition of claim 3, wherein said compound having at least one aliphatic unsaturated group and at least two phenylene skeletons in a molecule is of the formula:

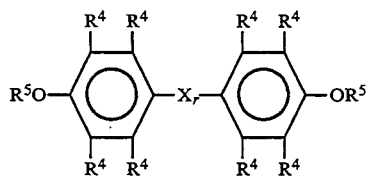

wherein $R^4$ is a hydrogen atom, a hydroxyl group, a halogen atom, an alkyl group or an alkenyl group, $R^5$ is an alkenyl group, $-R_t^6-SiR_3^7$, or $-CO-R^7$, wherein at least one $R^5$ group is an alkenyl group or an organic group containing an alkenyl group, and $R^6$ is an alkylene group, $R^7$ is an alkyl, alkenyl or alkoxy group, and t is equal to 0 or 1, and X is selected from the following groups:

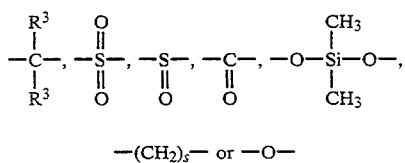
—(CH$_2$)$_s$— or —O— wherein R$^3$ is a hydrogen atom, a halogen atom, or a substituted or unsubstituted alkyl, aryl, alkenyl or alkynyl group, and s is a positive number of at least 2, and letter r is equal to 0 or 1.

5. The adhesive silicone composition of claim 3 wherein said compound having at least one aliphatic unsaturated group and at least two phenylene skeletons in a molecule is of the formula:

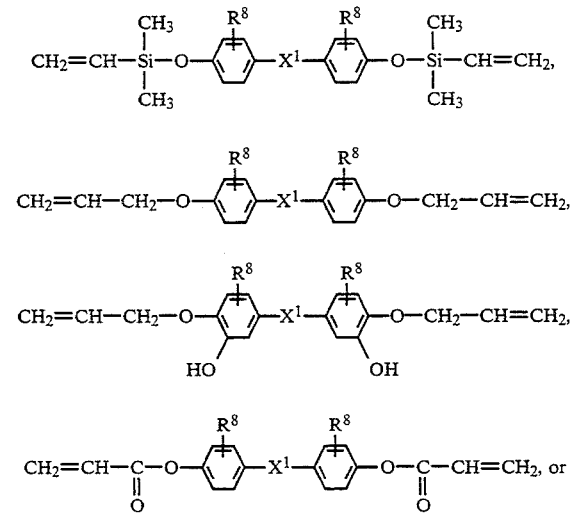

wherein X$^1$ is —O—, —CH$_2$—,

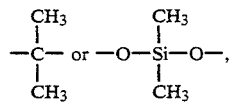

and R$^8$ is a hydrogen atom, vinyl or allyl group.

6. The adhesive silicone composition of claim 1 which contains per 100 parts by weight of organopolysiloxane (A), about 1 to about 20 parts by weight of organohydrogenpolysiloxane (B) and about 0.1 to about 20 parts by weight of compound (C).

7. The adhesive silicone composition of claim 1, which further comprises an organopolysiloxane compound having a SiH group and an alkoxysilyl and/or glycidyl group in a molecule.

8. The adhesive silicone composition of claim 7 wherein said compound having a SiH group and an alkoxysilyl and/or glycidyl group in a molecule is of the formula:

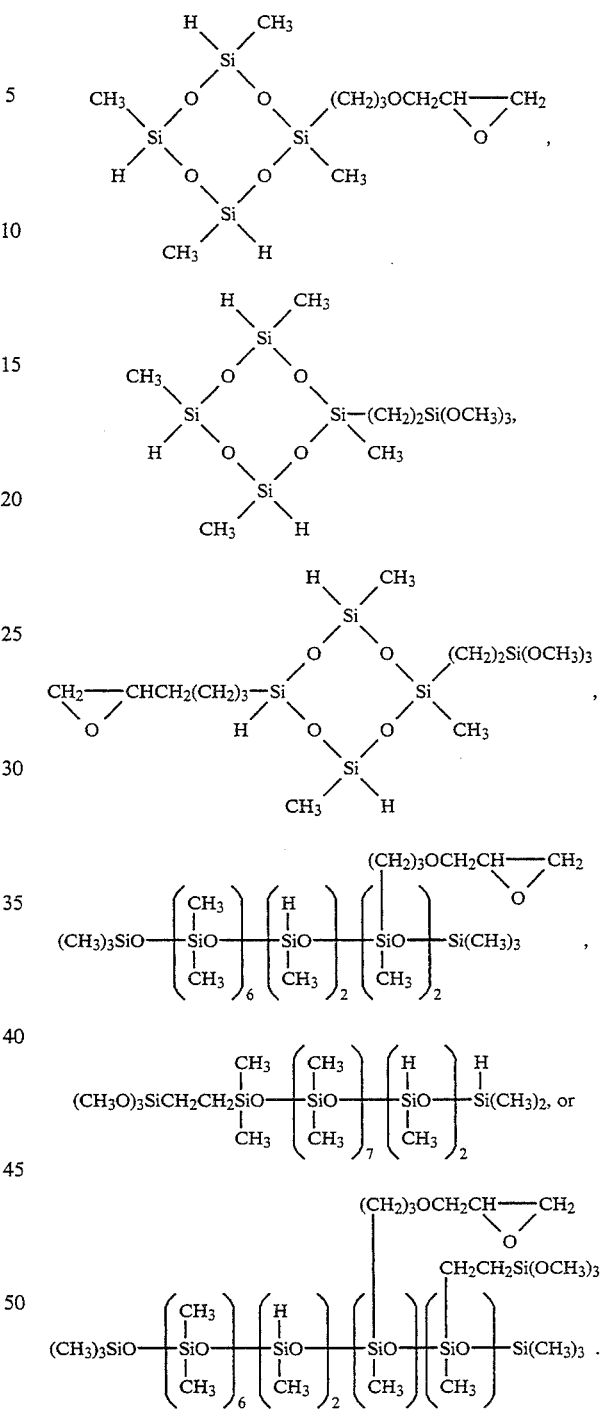

9. The adhesive silicone composition of claim 7, wherein said compound having a SiH group and an alkoxysilyl and/or glycidyl group in a molecule is present in an amount of about 0.1 to 20 parts by weight per 100 parts by weight of the organopolysiloxane (A).

10. The adhesive silicone composition of claim 2, wherein R$^1$ of the organopolysiloxane (A) is a hydrocarbon having 1 to 10 carbon atoms.

11. The adhesive silicone composition of claim 2, wherein R$^1$ of the organopolysiloxane (A) is selected from the group consisting of methyl, ethyl, propyl, isopropyl, butyl, tert-butyl, hexyl, cyclohexyl, octyl, vinyl, allyl, propenyl, isopropenyl, butenyl, hexenyl, cyclohexenyl, phenyl, totyl, xylyl, benzyl, phenylethyl, chloromethyl, cyanoethyl and 3,3,3-trifluoropropyl.

12. The adhesive silicone composition of claim 2, wherein 2 to 10 alkenyl groups are contained in organopolysiloxane (A).

13. The adhesive silicone composition of claim 1, wherein R of the organohydrogenpolysiloxane (B) is a hydrocarbon having 1 to 10 carbon atoms, and n is an integer of 3 to 50.

14. The adhesive silicone composition of claim 1, wherein R of the organohydrogenpolysiloxane (B) is selected from the group consisting of methyl, ethyl, propyl, isopropyl, butyl, tert-butyl, hexyl, cyclohexyl, octyl, vinyl, allyl, propenyl, isopropenyl, butenyl, hexenyl, cyclohexenyl, phenyl, tolyl, xylyl, benzyl, phenylethyl, chloromethyl, cyanoethyl and 3,3,3-trifluoropropyl.

15. The adhesive silicone composition of claim 6, which contains about 1 to about 5 parts by weight of organohydrogenpolysiloxane (B) per 100 parts by weight of organopolysiloxane (A).

16. The adhesive silicone composition of claim 1, further comprising a hydrogenpolysiloxane represented by the formula

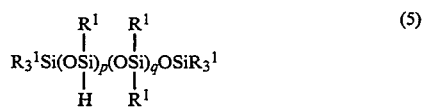

wherein $R^1$ is a substituted or unsubstituted monovalent hydrocarbon group having 1 to 10 carbon atoms, p is an integer of at least 3, q is an integer of at least 1, and p+q is an integer of 4 to 300, in an amount of 0.5 to 10 parts per 100 parts by weight of organopolysiloxane (A).

17. The adhesive silicone composition of claim 3, wherein in $R^2$ and $R^3$ of the compound having at least one aliphatic unsaturated group and at least two phenylene skeletons in a molecule, the alkyl and alkoxy groups have 1 to 10 carbon atoms, the aryl group has 6 to 10 carbon atoms, the alkenyl, alkynyl and alkenyloxy groups have 2 to 10 carbon atoms and the monovalent organic group containing an alkenyl, alkoxy, glycidyl, carbonyl, carbonyloxy, silyloxy or alkoxysilyl group has 1 to 12 carbon atoms.

18. The adhesive silicone composition of claim 4, wherein in $R^4$ of the compound having at least one aliphatic unsaturated group and at least two phenylene skeletons in a molecule, the alkyl group has 1 to 10 carbon atoms and the alkenyl group has 2 to 10 carbon atoms, in $R^5$, the alkenyl group has 2 to 12 carbon atoms and the monovalent organic group containing an alkenyl group has 2 to 12 carbon atoms, in $R^6$, the alkylene group has 1 to 6 carbon atoms, and in $R^7$, the alkyl group has 1 to 6 carbon atoms, the alkenyl group has 2 to 6 carbon atoms and the alkoxy group has 1 to 6 carbon atoms.

19. The adhesive silicone composition of claim 1, wherein the platinum catalyst is selected from the group consisting of platinum black, chloroplatinic acid, alcohol-modified chloroplatinic acid, and complexes of chloroplatinic acid with olefin, aldehyde, vinylsiloxane or acetylene alcohol.

20. The adhesive silicone composition of claim 1, wherein the catalyst is present in an amount of about 0.1 to 1000 parts by weight of elemental platinum per million parts by weight of the composition.

* * * * *